Sept. 2, 1958   H. W. MULCAHY   2,850,174
DRAFT GEAR FOR RAILWAY DRAFT RIGGING
Filed March 22, 1956   2 Sheets-Sheet 1

Inventor:
Harry W. Mulcahy.

Sept. 2, 1958  H. W. MULCAHY  2,850,174
DRAFT GEAR FOR RAILWAY DRAFT RIGGING
Filed March 22, 1956  2 Sheets-Sheet 2
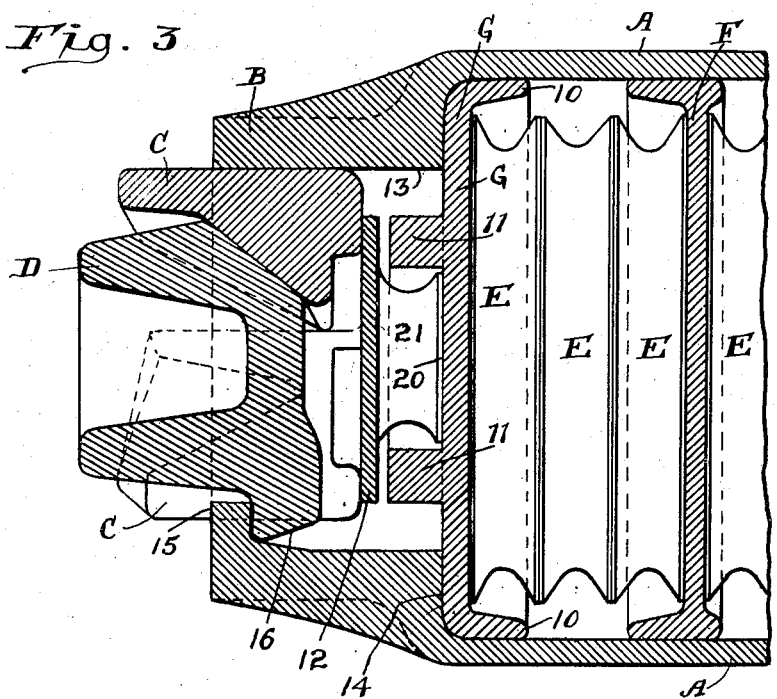
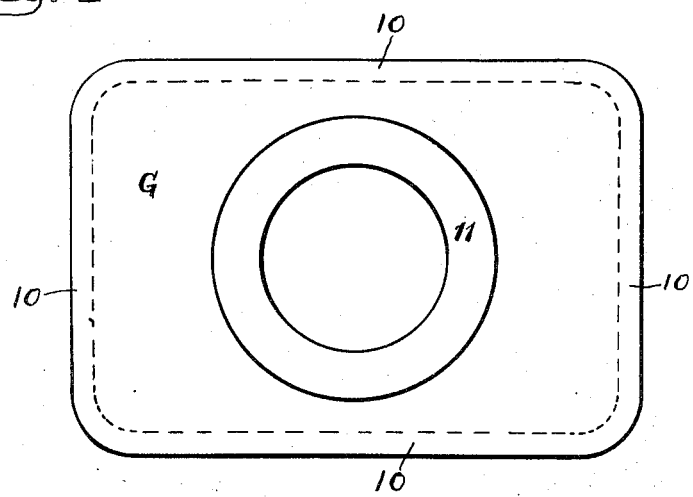
Inventor:
Harry W. Mulcahy

2,850,174

DRAFT GEAR FOR RAILWAY DRAFT RIGGING

Harry W. Mulcahy, Chicago, Ill., assignor to W. H. Miner, Inc., Chicago, Ill., a corporation of Delaware Application March 22, 1956, Serial No. 573,243

4 Claims. (Cl. 213—24)

This invention relates to draft gear for railway draft rigging.

It is a main object of the invention to provide in an encased friction gear, means for maintaining the friction shoes and wedge tight in the casing, even though the shoes and wedge become worn through repeated use.

Another object of the invention is to provide in an encased friction gear having friction surfaces in the casing and shoulders at the rear ends of the surfaces, against which shoulders a front follower is forced by expansion of a resilient column, means for forcing friction shoes into tight engagement with said surfaces and with an operating wedge when said follower is forced against the shoulders by the column.

Further objects of the invention, not specifically mentioned here, will be apparent from the detailed description and claims which follow, reference being had to the accompanying drawings in which a preferred embodiment of the invention is shown by way of example and in which:

Figure 3 is a view similar to Figure 2, showing the gear in another position; and Figure 4 is an elevational view of the front follower of the gear.

Figure 1:
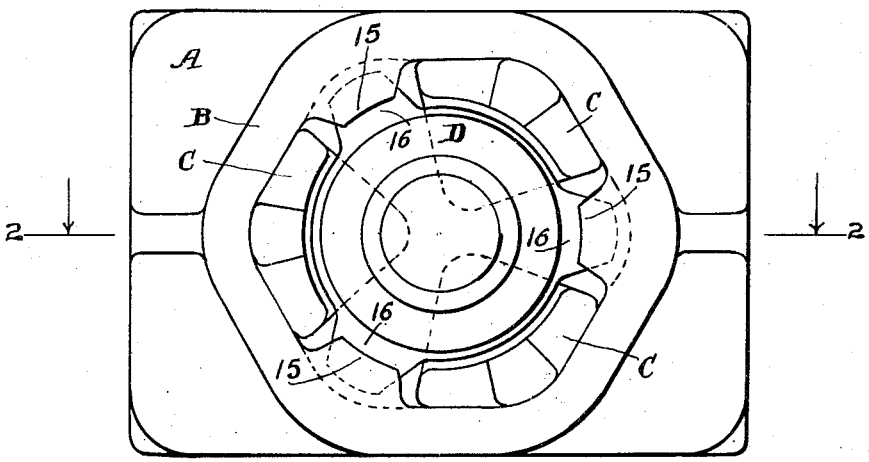
Figure 1 is a front end elevational view of the gear.

As will be seen from the drawings, the gear of the present invention consists of a casing A which has a friction element B at its forward end, in which friction element friction shoes C and wedge D are fitted in the usual manner. Within the casing A is a resilient column consisting of a plurality of units E which are divided into groups by aligning separators F of which but one is shown, since the units and column are of known design and the particular type of such devices forms no essential part of the present invention.

Located within the casing, between the resilient column and friction elements, is a front follower G which has flanges 10 that extend rearwardly of the gear and are in sliding engagement with the walls of the casing. Forwardly extending from the front follower G is a boss 11 which from Figure 4 will be seen to be in the form of a hollow cylinder. A plate 12 is disposed between the forward end of the boss 11 and the rear ends of the friction shoes C.

Within the friction element B are friction surfaces 13 engaged by the friction shoes C. At the inner end of element B is a shoulder 14 and the forward end thereof contains inwardly extending lugs 15 which are engaged by lugs 16 on the wedge D in known manner, to secure the wedge and friction shoes C in the casing.

Figure 2:
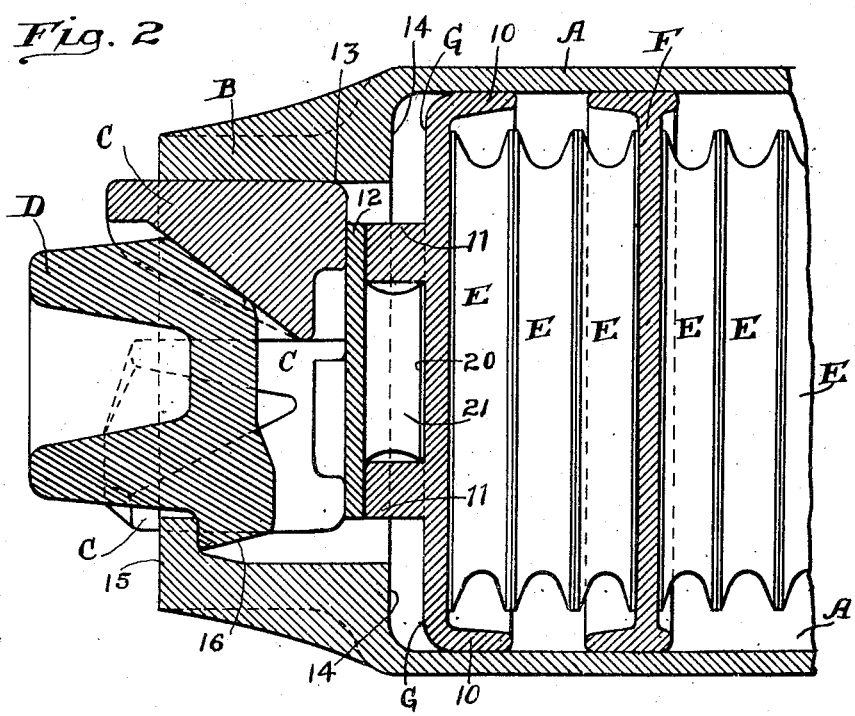
Figure 2 is a fragmentary cross sectional view taken along the line 2—2 of Figure 1, looking in the direction of the arrows.

The resilient column is placed under initial compression and secured in such state by suitable means, such as a removable rear wall for the casing, of known design, which has been omitted from the drawings to avoid an unnecessary complication thereof. When the gear is new, the friction surfaces 13 and shoes engaged thereby, and the interengaging surfaces of the shoes and wedge D, are of such dimension that the initial compression of the resilient column forces the front follower G forwardly in the casing, abutting the boss 11 against the plate 12, as shown in Figure 2, thereby to limit this forward movement of the front follower. It will be noted that there is an appreciable space between the forward face of the front follower G and the shoulder 14 within the casing.

Repeated operation of the gear in service causes wear of the friction surfaces on the casing, the shoes and the wedge, with the result that as this wear progresses the shoes are pushed farther and farther forwardly in the friction element B of the casing. This forward movement of the shoes permits forward movement of the front follower G and ultimately will permit the resilient column to expand sufficiently to abut the front follower G against the shoulder 14 in the casing, in which position the parts are shown in Figure 3. When this condition occurs, further wear of the friction surfaces of the casing, shoes and wedge will result in undesirable looseness in the friction element and it is to the correction of this condition that the present invention particularly relates.

To this end I have provided a resilient element consisting of a metallic plate 20 that fits within the boss 11 and abuts against the front face of the front follower G. Bonded to this plate 20 and to the rear face of the plate 12 is a rubber pad 21 which is normally compressed to a fixed amount limited by the engagement of the boss 11 with the plate 12. When the front follower G engages the shoulder 14 and is thereby rendered incapable of further forward movement, any play between the friction surfaces 13, friction shoes C and wedge D, is taken up by expansion of the rubber pad 21, such expansion moving the plate 12 away from the boss 11 in the manner shown in Figure 3. Thus it will be seen that even though the friction elements of the gear wear to such an extent that the main resilient column of the gear is no longer capable of maintaining the friction elements tight in the casing, the additional rubber pad 21 will expand, thereby to keep the gear tight.

In assembling the gear, the casing is placed rear end uppermost, the friction elements C and D are inserted, and the lugs 16 on the wedge engaged with the lugs 15 on the casing in known manner. Plate 12, rubber pad 21 and plate 20 are inserted as a unit followed by the front follower G, resilient elements E and aligning separators F in the usual manner. The resilient column is then compressed and the gear closed by insertion of the rear wall in known manner.

In operation, forces acting on the gear to move the wedge and friction shoes inwardly of the casing are resisted by the main column by direct engagement with the plate 12 with the boss 11 on the front follower. When wear of the friction elements progresses to the stage shown in Figure 3, initial movement of the friction elements inwardly of the casing is resisted solely by the rubber pad 21, which is of relatively low resistance though is quickly overcome to permit the plate 12 to move into direct contact with the boss 11 on the front follower. Further movement of the friction elements inwardly of the casing is then resisted by the main resilient column in the usual manner.

Since the area of pad 21 is much smaller than is that of pads E in the main column, smaller force will be required to compress pad 21 sufficiently to move plate 12 into engagement with boss 11. This is particularly true if the pad 21 is made of rubber of the same composition and durometer hardness as that of the pads E. Preferably the rubber in pad 21 is of different composition than that of pads E to increase the force required to move plate 12 into engagement with boss 11. So long as pad 21 has sufficient resiliency to expand sufficiently to keep the shoes C and wedge D tight in the casing, the conditions of the invention are fulfilled. If desired, several thin metal-faced pads may be substituted for the single pad shown within the teachings of the invention.

Having thus complied with the statutes and shown and described the preferred embodiment of the invention, what I consider new and desire to have protected by Letters Patent is pointed out in the appended claims.

What I claim is:

1. In a draft gear for railway draft rigging, the combination of a casing; friction surfaces at the front end of the casing; friction shoes engaging said surfaces; a wedge engaging said shoes and projecting beyond the front end of the casing; interengaging lugs on the wedge and casing for holding the wedge and shoes in the casing; a first plate engaging the rear ends of said shoes; shoulder means within the casing at the rear end of said friction surfaces; a front follower disposed within the casing; a boss on said front follower projecting forwardly therefrom and normally engaging said first plate; a resilient column in said casing engaging said front follower and urging the same forwardly thereby to force the shoes tightly against said friction surfaces and wedge; and a normally fully compressed resilient means interposed between said front follower and first plate, which means expands to maintain the shoes tightly against said friction surfaces and wedge after said front follower engages said shoulder means.

2. A draft gear as specified in claim 1, in which the resilient means consists of a second plate engaging the front follower and a rubber pad bonded to said first and second plates.

3. A draft gear as specified in claim 1, in which the boss on the front follower is a hollow cylinder and the normally fully compressed resilient means is disposed within that boss and is expandible forwardly therefrom.

4. A draft gear for railway draft rigging comprising a metallic casing containing a cavity in its rear portion; shoulder means at the forward end of said cavity; a front follower within said cavity; a main resilient column within the cavity bearing against said front follower and urging the same toward said shoulder means; boss means on said follower extending forwardly therefrom beyond said shoulder means; friction surfaces in said casing extending forwardly from said shoulder means; friction shoes engaging said friction surfaces; a wedge engaging said friction shoes and extending outwardly therefrom beyond the end of the casing; interengaged lugs on the wedge and casing for holding the shoes and wedge in the casing; a first plate interposed between the rear ends of said shoes and the forward ends of said boss means normally engaging the shoes and boss means to hold the shoes tightly against the friction surfaces and wedge and to hold the front follower spaced from said shoulder means; a second plate disposed against the front face of said front follower within said boss means; a rubber pad disposed between and bonded to said first and second plates, said pad, being under maximum compression normally, expanding, when wear of the shoes and wedge permits said main resilient column to move said front follower against said shoulder means, thereby to hold said shoes snugly against said friction surfaces and wedge notwithstanding said wear.

References Cited in the file of this patent

UNITED STATES PATENTS

| | | |
|---|---|---|
| 1,609,302 | O'Connor | Dec. 7, 1926 |
| 1,667,799 | O'Connor | May 1, 1928 |
| 1,692,688 | O'Connor | Nov. 20, 1928 |
| 2,715,967 | Mulcahy | Aug. 23, 1955 |